United States Patent Office 3,247,057
Patented Apr. 19, 1966

3,247,057
INHIBITING THE GROWTH OF BACTERIA AND FUNGI WITH APPLICATION THERETO OF 2-BROMO-INDANONE-1 OR 2,2-DIBROMO-INDANONE-1
George E. Lukes, El Cerrito, and Malcolm B. McClellan, San Jose, Calif., assignors to Stauffer Chemical Company, New York, N.Y., a corporation of Delaware
No Drawing. Filed Dec. 16, 1963, Ser. No. 330,576
3 Claims. (Cl. 167—30)

This invention relates to the use of certain cyclic compounds as bactericides and fungicides. More specifically, the invention relates to such use of 2,2-dibromo-indanone-1:

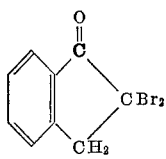

and 2-bromo-indanone-1:

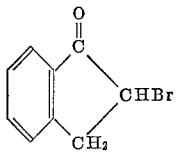

The compounds of the present invention are known and their preparations have been described several times in the prior art.

It has now been found that 2,2-dibromo-indanone-1 and 2-bromo-indanone-1 are effective as bactericides and fungicides. The compounds have been tested and found active as the following typical tests show.

The compounds were tested against growing fungi and bacteria in an artificial medium. Fungi and bacteria are tested in vitro starting with 3 1-ounce vials partially filled, two (2) with malt broth and one (1) with nutrient broth. The compound to be tested is placed in the vials at any desired concentration (expressed in parts per million) and mixed with the broth. The vials are inoculated with a water suspension of spores of the desired fungi and cells of bacteria (one organism per vial). The bottles are then sealed and held for one week, after which time the results are observed and noted. The following data were obtained in this manner for 2,2-dibromo-indanone-1 and 2-bromo-indanone-1.

IN VITRO VIAL TEST

*Concentration (p.p.m.) which allowed no growth*

|  | Aspergillus niger | Penicillium sp. | Escherichia coli |
|---|---|---|---|
| 2,2-dibromoindanone-1 | 5 | 10 | 10 |
| 2-bromo-indanone-1 | 5 | 10 | 25 |

In the soil fungicide incorporation test, the activity of the compound was determined against soil-borne pathogenic fungi. Two fungi are used and tested separately, *Rhizoctonia solani* and *Fusarium solani*. Each fungus was added to separate amounts of soil and then 1-pound portions were placed in quart jars. The chemical to be tested was pipetted into the fungus infested soil at a rate of 110 p.p.m., mixed thoroughly, and then placed in a paper container. Cotton was planted into *Rhizoctonia solani*-infested and treated soil. Beans were planted into *Fusarium solani*-infested and treated soil. Three to four weeks later the plants were inspected for disease symptoms. The lowest concentrations which prevent development of disease symptoms were recorded. The compound 2,2-dibromo-indanone was found to control *Fusarium solani* 100% at 27 parts per million.

The compounds of the present invention find particular utility as bactericides and fungicides and may be applied in a variety of ways at various concentrations. They may be combined with suitable carriers and applied as dusts, sprays or drenches. The amount applied will depend on the nature of the utility. The rate of application may also vary with the microbiological use intended.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. The method of inhibiting the growth of bacteria and fungi, comprising applying thereto an effective amount of 2-substituted-indanone-1 corresponding to the formula

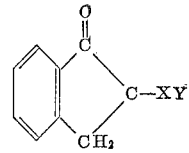

wherein X is selected from the group consisting of hydrogen and bromine and Y is bromine.

2. The method of inhibiting the growth of bacteria and fungi, comprising applying thereto an effective amount of 2,2-dibromo-indanone-1.

3. The method of inhibiting the grow of bacteria and fungi, comprising applying thereto an effective amount of 2-bromo-indanone-1.

References Cited by the Examiner

UNITED STATES PATENTS

| | | |
|---|---|---|
| 2,786,069 | 3/1957 | Kundiger et al. 260—429.9 |
| 2,802,875 | 8/1957 | Kundiger et al. 260—590 |
| 2,881,218 | 4/1959 | Kundiger et al. 260—590 |
| 2,882,318 | 4/1959 | Kundiger et al. 260—566 |
| 2,894,952 | 7/1959 | Amstutz et al. 260—289 |
| 2,984,600 | 5/1961 | Sharp 167—30 |

FOREIGN PATENTS 722,679   1/1955   Great Britain.

OTHER REFERENCES

Gori, E.: "Antibacterial Activity of Coumarin and Indandione Compounds," Intern. Conf. Thrombosis and Embolism, 1st, Basel (1954), Proc. pp. 271–4, Pub. 1955 (In English); Abstracted in Chem. Abstracts 53: 7306c (1959).

House et al.: "The Synthesis of Derivatives of 1-Indanone and Indenone," J. Am. Chem. Soc. 82: 1452–7 (1960); Abstracted in Chem. Abstracts 54: 15333b (1960).

Sankyo Ltd. Japan 4133 (1962) June 11, 1962; 2 pp. spec. (Abstracted in English in Chem. Abstracts 58: p. 7886e (1963)).

LEWIS GOTTS, *Primary Examiner.*